United States Patent [19]

Frings

[11] Patent Number: 5,079,042

[45] Date of Patent: Jan. 7, 1992

[54] DRYWALL JOINT FINISHING SYSTEM

[75] Inventor: Myles E. Frings, Hubertus, Wis.

[73] Assignee: Solid Products, Inc., Richfield, Wis.

[21] Appl. No.: 658,711

[22] Filed: Feb. 21, 1991

[51] Int. Cl.⁵ .......................... B05D 1/36; B05D 7/00
[52] U.S. Cl. ................................ 427/403; 52/741; 106/778; 106/779; 106/780; 524/8
[58] Field of Search ................... 106/778, 779, 780; 427/403, 462.1; 524/2, 8; 52/741

[56] References Cited

U.S. PATENT DOCUMENTS

| | | | |
|---|---|---|---|
| 4,146,402 | 3/1979 | Kira et al. | 106/780 X |
| 4,363,666 | 12/1982 | Johnson et al. | 524/8 X |
| 4,645,548 | 2/1987 | Taka et al. | 106/780 X |

Primary Examiner—Michael Lusignan
Attorney, Agent, or Firm—Quarles & Brady

[57] ABSTRACT

A system for finishing the joint between abutting panels of drywall by applying one or two of a joint compound comprising mostly gypsum plaster together with a small amount of monofilament fibers about 4 mm to 10 mm long.

4 Claims, 2 Drawing Sheets

DRYWALL JOINT FINISHING SYSTEM

FIELD OF THE INVENTION

The present invention relates to the art of filling the joints between drywall panels, particularly the horizontal joints between adjoining or abutting drywall panels.

BACKGROUND OF THE INVENTION

Drywall as used in the form of panels for interior walls consists of an inner core of gypsum plaster between two outer layers of paper or a mixture of paper and wood fibers. Interior walls of buildings, including residential, commercial and industrial buildings, typically are made of drywall panels nailed to wood or metal studs, drywall having largely replaced plaster for this purpose. Drywall is sold in various panel sizes, such as 4 ft. by 8 ft., 10 ft. or 12 ft. long and the long edges of the panels are positioned horizontally in a wall installation. The joint between the abutting horizontal edges of two drywall panels must be filled with an appropriate joint compound in order to hide the joint between the two panels and develop a flat wall surface from floor to ceiling. The edges of drywall panels to be finished with the joint compound are formed to include a shallow recess along their respective edges and may have a round end or flat end depending on whether the drywall is to be installed on wood studs or metal studs.

The prior art methods and materials utilized for finishing the joint between drywall panels is described in the detailed description which follows and illustrated in the drawings. Ou analysis indicated several disadvantages with the prior art drywall joint finishing techniques: a significant degree of shrinking of the known joint compounds, the necessity of using paper tape or fiberglass tape along a joint finished by the prior art techniques, and the rather low bond strength exhibited by prior art joint compounds. Accordingly, the principal objectives of the development program that culminated in the present invention were to develop a new system for finishing the joints between drywall panels, develop a new joint compound having a higher bond strength than known compounds, and develop a drywall joint finishing system that would eliminate the necessity to use paper o fiberglass tape along the joint. These and other more specific objectives will become apparent from the detailed description which follows.

SUMMARY OF THE INVENTION

My present invention provides a new system for finishing the joints between abutting panels of drywall including the steps of applying a first coat of a specified joint compound and applying a finish coat of any suitable joint compound over the first coat when the drywall is attached to metal studs, or initially applying a prefill coat of the specified joint compound and then applying the first coat of the specified joint compound, followed by a finish coat of any suitable joint compound when the drywall is attached to wood studs. Further in accordance with the present invention, the joint compound used for the first coat and the prefill coat in the foregoing processes is of a new formulation incorporating a specified type of fibers of a specified size dispersed throughout a matrix consisting largely of calcium sulfate (gypsum plaster). Suitable formulations for the joint compound are presented in the detailed description. It has been found that the new drywall joint systems utilizing the new joint compound meet the deficiencies of the prior art techniques discussed above.

BRIEF DESCRIPTION OF THE DRAWINGS

The present invention is described in full and enabling detail by reference to the accompanying drawings, in which.

DESCRIPTION OF PREFERRED EMBODIMENTS

Parts (a) and (c) of the following description relate to prior art drywall joint finishing systems, whereas parts (b) and (d) describe our new drywall joint finishing systems. (a) Prior Art Joint Finishing System, Drywall Panels on Wood Studs, FIG. 1

Figure 1:
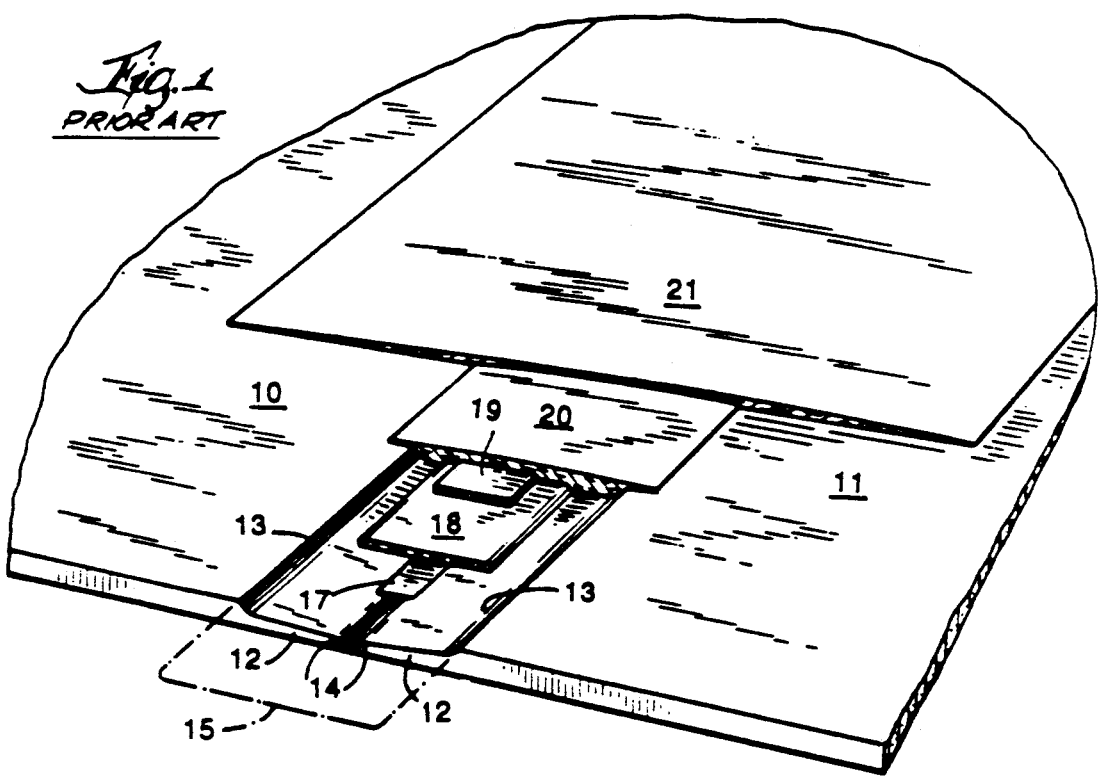
FIG. 1 is a perspective view, with portions broken away, of the typical prior art system for finishing the joint between two abutting panels of drywall attached to wood studs.

FIG. 1 illustrates drywall panels 10 and 11 screwed or nailed to wood studs (not shown). Each of panels 10 and 11 is formed to have a shaped edge portion 12 configured to include a shallow recess 13 and a rounded end 14. Shaped edge portions 12 are formed along the two longitudinal edges of each panel, which edges are positioned horizontally when the panels are attached to the studs so that the shaped edge portions define the horizontal joint between abutting panels. When panels 10 and 11 are attached to wood studs with a shaped edge portion 12 of one panel butted along the shaped edge portion 12 of the other panel, the recesses 13 at the edge of each panel combine to form a shallow channel 15 along the joint between the two panels that has a V-shaped or tulip-shaped bottom formed by the round ends 14 of the panels, and the channel must be filled in order to conceal the joint between the two panels.

The first step in the prior art joint finishing technique is to apply a prefill coat 17 of joint compound which essentially fills the space at the bottom of channel 15 between the rounded ends 14 of the two panels. The prefill coat is used to minimize damage to the joint that may be caused as the wood studs shrink and the panels tend to pull apart. Two types of joint compounds are used for the prefill coat, and for subsequent layers in the prior art technique, consisting either of (1) a drying type of compound comprising principally (such as about 70%) limestone, which usually is premixed with water, or (2) a setting type of compound comprising principally (such as about 70%) gypsum plaster. The drying type of joint compound is used most often by drywall installers. Water is added to both types of compounds before the compound is applied to the wall. After prefill coat 17 is applied with the wet joint compound, the compound is allowed to dry when a limestone-based joint compound is used, which can take a minimum of 24 hours and often several days or a week with humid conditions, or allowed to set when a gypsum plaster-based joint compound is used, which usually takes about 90 minutes although the compound formulation can be adjusted to provide shorter setting times such as about 45 minutes.

The second step in the prior art joint finishing technique is to apply an embedding coat 18 over the dried prefill coat 17. Embedding coat 18 also only partially fills channel 15. While embedding coat 18 is still wet, a tap 19 is pressed into embedding coat 18. Tape 19 is about 2" wide and may be either a strip of paper or a strip of fiberglass cloth having pressure sensitive adhesive along one surface. Tape 19 is added to the joint because of the relatively low internal strength of the prior art joint compounds. Embedding coat 18 is then allowed to dry, which again, will generally take about 90 minutes or at least 24 hours depending on the formulation of the joint compound.

Next, a first coat 20 of the joint compound is applied over the previous layers to completely fill channel 15 and is of a width sufficient to extend beyond the outer boundaries of channel 15. For example, first coat 20 may be about 5 to 6 inches wide so that it can be gently tapered or feathered into the surrounding surfaces of the drywall panels. First coat 20 is then allowed to dry or set, which will require the times noted above for the first two layers of the joint system.

The last step in the prior art drywall joint finishing system consists of applying finish coat 21 over the underlying layers of the joint. Finish coat 21 is usually quite wide, such as about 10 to 12 inches wide and relatively thin so as to be gently tapered or feathered into the surrounding surfaces of the drywall panels to be as inconspicuous as possible. Finish coat 21 is most often smoothed with a hand tool such as a trowel or broad knife when applied by a professional drywaller in order to provide a joint that appears as flat as possible. Finish coat 21 usually requires 24 hours or more to fully dry or set before further work is performed on the wall.

The drying type of prior art joint compounds typically include about 70% to 80% by weight limestone and the balance a mixture of one or more fillers such as perlite and mica and binders such as clay, starches or resinous binders. The setting type of prior art joint compounds usually include about 70% to 80% gypsum plaster 10% to 20% limestone and other fillers, and the balance binders such as clay, starches or resinous binders.

Figure 2:
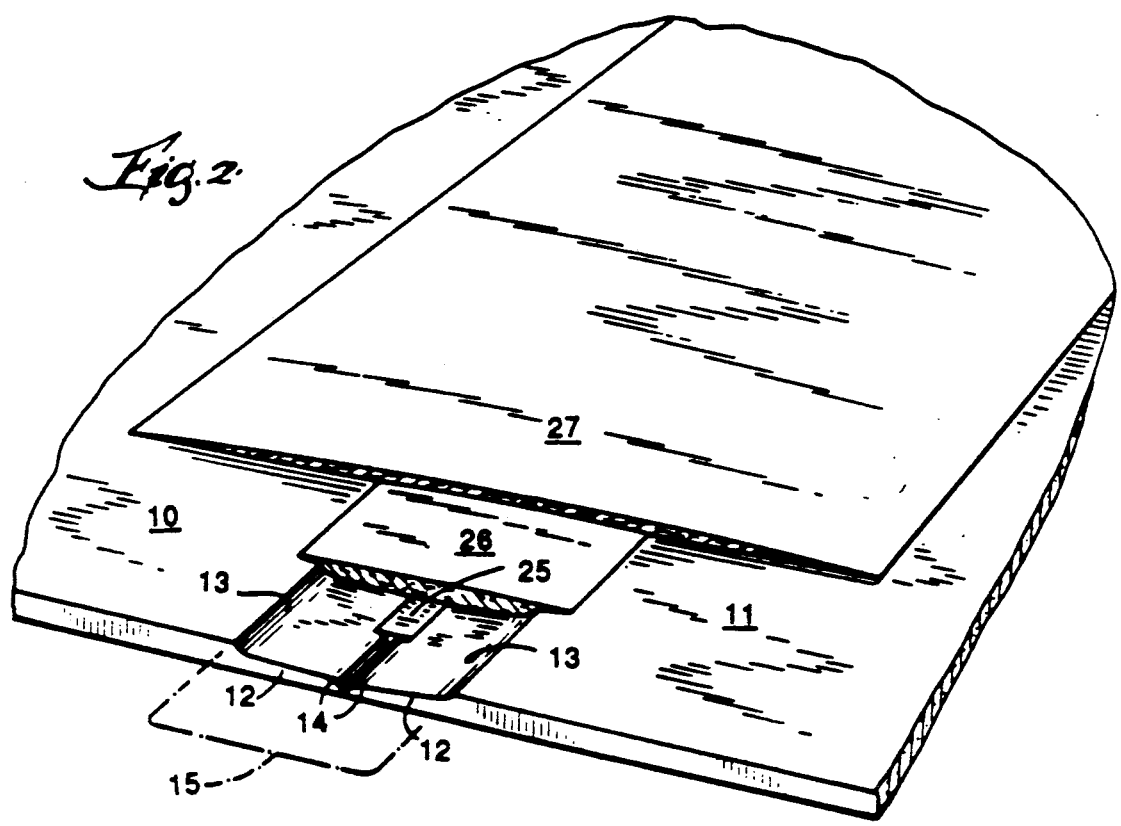
FIG. 2 is a perspective view, with portions broken away, of my new system for finishing the joint between two abutting panels of drywall attached to wood studs.

(b) New Joint Finishing System, Drywall Panels on Wood Studs, FIG. 2

The joint between drywall panels 10 and 11 when finished according to the present invention is illustrated in FIG. 2. The first step in the new technique is to apply a prefill coat 25 along the bottom of channel 15 to fill the space between round ends 14 of the two panels. However, prefill coat 25 consists of a joint compound of a new composition which is described in detail in part (d) of this description.

After prefill coat 25 has set, the second step of the new technique consists of applying first coat 26 to cover prefill coat 25 and to completely fill channel 15; as shown in the drawing, first coat 26 extends beyond the borders of channel 15 onto the surrounding surfaces of the panels 10 and 11. First coat 26 is feathered out along each side of the joint between the panels. First coat 26 also is a layer of the new joint compound described below in part (d).

The next, and final, step in the new technique is to apply finish coat 27 over first coat 26 after it has dried. Finish coat 27 is quite wide, such as about 10 to 12 inches wide, and gently feathered into the surfaces of panels 10 and 11 to provide as flat a joint as possible. Coat 27 can be smoothed as necessary by the usual hand tools. Finish coat 27 is one of the prior art joint compounds described in part (a), usually a drying type compound.

Comparison of the new finished joint of FIG. 2 to the prior art finished joint of FIG. 1 will reveal two important differences. First, my new drywall joint finishing system eliminates the embedding coat 18 shown in FIG. 1. Second, the new system does not require the use of tape 19 as in the prior art finished joint of FIG. 1. The significance of this is that the new system eliminates the cost of the tape 19 and also the time required to apply and allow embedding coat 18 to dry, which results in reduction of both material and labor costs. Thus, the new system has eliminated two steps of the prior art method, applying the embedding coat and applying the tape required in the old method.

Figure 3:
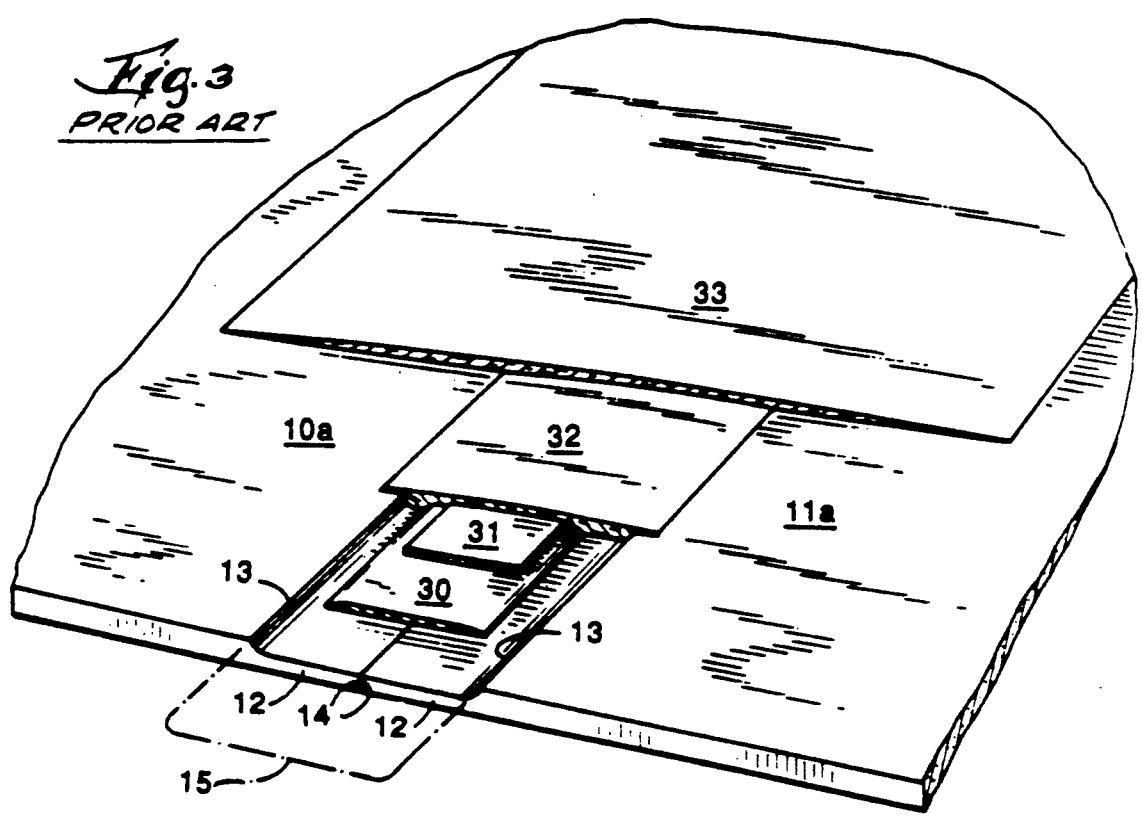
FIG. 3 is a perspective view, with portions broken away, of the typical prior art system for finishing the joint between two abutting drywall panels attached to metal studs.

(c) Prior Art Joint Finishing System, Drywall Panels on Metal Studs, FIG. 3.

FIG. 3 shows drywall panels 10a and 11a of the type that are screwed to metal studs. Both panels have a shaped edge portion 12 formed to include a shallow recess 13 and a flat end 14. The flat ends of the two panels abut each other when the drywall panels are attached to the metal studs, in which condition shallow channel 15 is defined along the horizontal joint between the panels.

The first step of the prior art technique for finishing the joint between panels 10a and 11a is to apply embedding coat 30 to partially fill channel 15. While embedding coat 30 is still wet, tape 31 is pressed into the coat. The joint compound used for coat 30, which is of one of the prior art compositions described in part (a), is then allowed to dry or set. Tape 31 can be a paper or fiberglass as was the case with tape 19.

The next step in the prior art method is to apply first coat 32 over embedding coat 30 so as to completely fill channel 15; coat 32 is feathered into the surfaces of 10a and 11a surrounding the channel. First coat 32, which is of one of the same prior art joint compounds as coat 30, is then allowed to dry or set as necessary.

The last step of the prior art system to finish the joint between drywall panels on metal studs is to apply finish coat 33 of the same joint compound over the underlying layers. Finish coat 33 is applied as a wide, such as about 10 to 12 inches wide, relatively thin coat that is feathered into the surrounding surfaces of the drywall panels.

Figure 4:
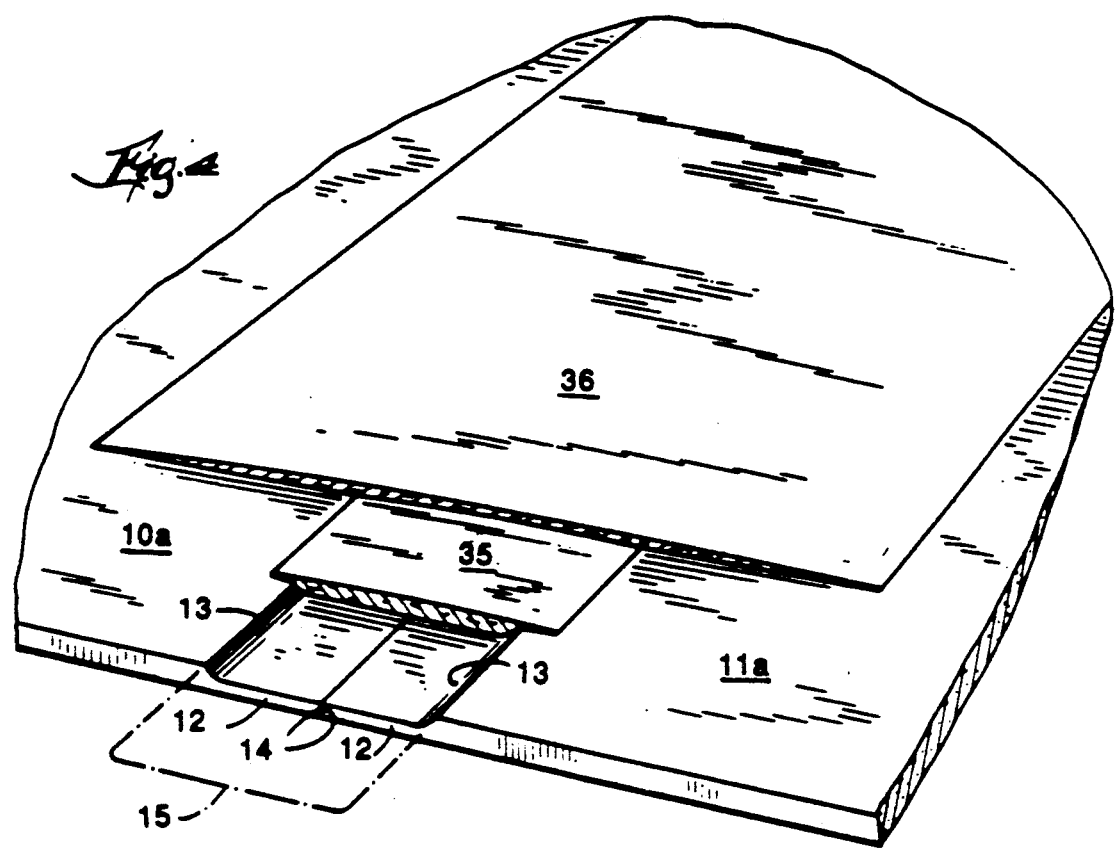
FIG. 4 is a perspective view, with portions broken away, of my new system for finishing the joint between abutting panels of drywall attached to metal studs.

(d) New Joint Finishing System, Drywall Panels on Metal Studs, FIG. 4.

Referring now to FIG. 4, the first step in the new system for finishing the joint between drywall panels 10a and 11a screwed onto metal studs in accordance with the present invention is to apply first coat 35 to completely fill channel 15. First coat 35 extends beyond the sides of the channel onto adjacent surfaces of the panels, and the coat is feathered into the panel surfaces. First coat 35 consists of joint compound of the new composition described below.

After first coat 35 has dried, the second and final step in my new joint finishing system is to apply finish coat 36 over first coat 35. In general, first coat 35 is about 5 to 6 inches wide and finish coat 36 is about 10 to 12 inches wide, although these dimensions can vary considerably. Finish coat 36 is one of the prior art joint compounds described in part (a), typically a drying type of joint compound. Finish coat 36 is feathered into adjacent surfaces of the two panels so as to provide a relatively flat joint, and can be smoothed with the usual hand tools such as a trowel or broad knife as it is being applied.

As compared to the prior art system of FIG. 3, it will be noted that the new joint finishing system eliminates the embedding coat 30 required in the prior art technique, which also results in eliminating the time delay needed to wait for embedding coat 30 to dry or set before proceeding with finishing the joint. In addition, tape 31 of the prior art system also is eliminated with my new system, which has the further result of saving the time required to apply the tape. As was the case with drywall panels attached to wood studs, the new finishing system eliminates the steps of applying an embedding coat and tape when the drywall is screwed to metal studs.

The principal essential feature of the new drywall finishing system of the present invention is using a joint compound of a new composition for the first coat and the prefill coat of the system. As with prior systems, the major component of the new joint compound is gypsum plaster (calcium sulphate), which is to comprise from about 65 to 75% of the formulation. (Percentages in this description and the claims are percent by weight of the dry joint compound.) The new joint compound can include about 10% to 25% of fillers such as calcium carbonate (limestone), mica and perlite; limestone is a useful filler as it enhances sandability of the compound and mica is useful for improving crack resistance and moisture impermeability. The joint compound must include one or more binders, such as clay, natural starch, synthetic starch, sodium carboxymethyl cellulose and/or a resinous binder such as a vinyl resin; about 5% to 15% binder can be present in the formulation. Finally, the essential component of the new joint compound consists of a small proportion of fibers of a specific type, in an amount within a specified range critical to obtain proper functioning of the compound and within a defined size range necessary for proper functioning.

The fiber to be included in the new joint compound of the invention consists of acrylic monofilament fibers, particularly such fibers having a high modulus of elasticity in the range of about 3,000 to 16,000 N/mm$^2$, preferably about 13,000 to 15,500 N/mm$^2$. Further, the acrylic fibers are to be in the range of about 4 to 10 mm long, preferably about 4 to 8 mm long. As to concentration, the acrylic fibers are to be present in the range of only about 0.07% to 0.16%, preferably about 0.1%. It has been found that the compound is unworkable if the amount of fibers in the compound is more than about 0.16%, whereas less than about 0.07% fibers is insufficient to enhance the internal strength of the compound to the extent necessary to achieve the objectives of the invention.

Thus, the new joint compounds for use with the drywall joint finishing technique of the present invention consist essentially of gypsum plaster, filler and binder compounds, together with about 0.07% to 0.16% of acrylic monofilament fibers in the range of about 4 to 10 mm long. A generalized formulation for the new joint compounds is as follows:

| | | |
|---|---|---|
| (1) Gypsum plaster | 65% to 75% | |
| (2) Filler(s) | 10% to 25% | |
| (3) Binder(s) | 5% to 15% | |
| (4) Acrylic fibers | 0.07% to 0.16% | |

Acrylic fibers suitable for use in the joint compounds are available commercially from Courtaulds Fibres under their registered trademark Sekril ®.

| | | |
|---|---|---|
| (1) | Gypsum plaster | 71.40% |
| (2) | Fillers | |
| | Limestone | 14.29% |
| | Mica | 7.14% |
| (3) | Binders | |
| | Clay | 3.57% |
| | Hamaco gum starch | 1.71% |
| | Staramic starch | 1.71% |
| (4) | Miscellaneous | |
| | Sodium citrate | 0.07% |
| (5) | Fibers | |
| | Acrylic fibers, 6 mm long | 0.11% |

A batch of the above formulation was prepared by first blending a portion of the gypsum plaster and fillers with the fibers in an appropriate blender to fully disperse the fibers within the other solids, and then adding the balance of the gypsum plaster and other ingredients including binders in a second blender and fully dispersing the fibers throughout the mixture. The short acrylic fibers appear to become coated with other solid components and are blended without any significant agglomeration. The fibers showed no tendency to fibrillate or form fine particles during the mixing operation.

When ready for use in finishing a drywall joint, a 25 pound bag of the compound of the above formulation can be mixed with about 14 to 18 pints of water. The resulting wet mixture is extremely workable and the acrylic fibers remain totally dispersed throughout the wet mixture. The compound is applied to drywall joints in the manner described above in connection with FIGS. 2 and 4, depending on whether the drywall panels are mounted on wood studs or metal studs. The joint compound feathers extremely well with the usual drywaller's hand tools and also can be sanded or sponged if so desired after fully setting. Exceptionally high quality drywall joints were made using the compound that showed no shrinkage or cracking and exhibited upon setting excellent impact resistance.

The incorporation of the very small amounts of the acrylic fibers in the new joint compounds leads to surprising results. The new joint compounds, after setting or drying, have substantially higher internal strength than prior art joint compounds. This characteristic makes it possible to eliminate the tape required in the prior art techniques described above in connection with FIGS. 1 and 3 and eliminates the need to use an embedding coat which must be employed with the tape. Another unique characteristic of the new joint compounds of the invention is that they exhibit significantly less shrinkage on drying than the prior art joint compounds. A further highly useful characteristic is that the new joint compounds do not develop cracks after being fully set, as is the case with some prior art joint compounds. All of the features combine to provide a drywall joint of improved structural integrity and enhanced appearance. The new joint compounds also can be used to fill holes in drywall surfaces and to embed and fill metal cornerbead, nails and screws.

I claim:

1. In the method of finishing the joint between abutting edges of drywall panels including the steps of applying a first coat of a joint compound and then applying a finish coat of a joint compound over the first coat, the improvement comprising:
   (1) applying a first coat of a joint compound along the abutting edges of the drywall panels consisting essentially of gypsum plaster, fillers and binders together with about 0.07% to 0.16% of acrylic monofilament fibers in the range of about 4 mm to 10 mm long; and
   (2) applying the finish coat over the first coat after setting thereof.

2. The method of claim 1 further including the step of: applying a prefill coat along the abutting edges of the drywall panels prior to applying the first coat, the prefill coat consisting of joint compound of the same composition as the first coat.

3. A joint compound for finishing the joint between abutting edges of drywall panels consisting of:
   (1) a mixture of gypsum plaster, fillers and binders, and
   (2) about 0.07% to 0.16% of acrylic monofilament fibers in the range of about 4 mm to 10 mm long.

4. A joint compound according to claim 3 consisting of about 65% to 75% of gypsum plaster, 10% to 25% filler selected from the group of limestone, mica and perlite, and 5% to 15% binder selected from the group of clay, natural starch, synthetic starch, sodium carboxymethyl cellulose and vinyl binders.

* * * * *

UNITED STATES PATENT AND TRADEMARK OFFICE
CERTIFICATE OF CORRECTION

PATENT NO. : 5,079,042

DATED : January 7, 1992

INVENTOR(S) : Myles E. Frings

It is certified that error appears in the above-identified patent and that said Letters Patent is hereby corrected as shown below:

At Column 6, before Line 10, insert:

--Example

This example presents a specific formulation of a joint compound suitable for the practice of the invention.--

Signed and Sealed this

Sixth Day of April, 1993

Attest:

STEPHEN G. KUNIN

*Attesting Officer*  *Acting Commissioner of Patents and Trademarks*